United States Patent
Morishima et al.

(10) Patent No.: US 7,359,497 B2
(45) Date of Patent: Apr. 15, 2008

(54) AUDIO TELECONFERENCE SYSTEM WITH WIRELESS COMMUNICATION PORTABLE TERMINALS

(75) Inventors: Hisayuki Morishima, Kawasaki (JP); Takako Suzuki, Kawasaki (JP); Yuuki Yamamoto, Kawasaki (JP); Takashi Ohno, Kawasaki (JP); Satoshi Okuyama, Kawasaki (JP); Kenichi Horio, Kawasaki (JP); Jun Kakuta, Kawasaki (JP); Toshinao Gunchi, Shinjuku (JP); Yuji Tabuchi, Shinjuku (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 11/025,790

(22) Filed: Dec. 30, 2004

(65) Prior Publication Data

US 2006/0035630 A1   Feb. 16, 2006

(30) Foreign Application Priority Data

Aug. 10, 2004 (JP) .............................. 2004-233247

(51) Int. Cl.
*H04M 3/42* (2006.01)
(52) U.S. Cl. .................. 379/202.01; 370/261; 709/204
(58) Field of Classification Search ........... 379/202.01; 370/261; 709/204
See application file for complete search history.

(56) References Cited

U.S. PATENT DOCUMENTS 4,544,804 A   10/1985   Herr et al.
5,369,693 A   11/1994   Pillet et al.
5,594,948 A   1/1997   Talarmo et al.
5,901,363 A   5/1999   Töyrylä
6,023,626 A   2/2000   Kinnunen et al.
6,201,859 B1   3/2001   Memhard et al.

FOREIGN PATENT DOCUMENTS

EP   0 778 680   6/1997
JP   6-98029   4/1994

(Continued)

OTHER PUBLICATIONS

Nietzer, P., "Telekonferenzen im ISDN Attraktive Anwendung", Nachrichten Elektronik und Telematik, Verlag Dr. Huethig. Heidelberg, DE, vol. 44, No. 12, Dec. 1, 1990.

(Continued)

*Primary Examiner*—Quynh H. Nguyen
(74) *Attorney, Agent, or Firm*—Staas & Halsey LLP

(57) ABSTRACT

This invention is to enable transfer of a right to speak in an audio teleconference in view of usability. In this invention, a PoC server is introduced to achieve new functions, such as transfer of the right to speak, reservation to acquire the right to speak, and deprivation of the right to speak. The PoC server has a teleconference presence manager, a teleconference manager, and a teleconference audio communication manager. The right to speak is managed in a presence data storage of the teleconference presence manager. The teleconference presence manager directly manages the presence data storage, but the teleconference manager manages transfer of the right to speak. In addition, the teleconference manager manages reservation of the right to speak by a storage for a reservation list of the right to speak. The teleconference audio communication manager carries out routing of audio data. At that time, only audio data received from a user holding the right to speak is transferred.

10 Claims, 9 Drawing Sheets

FOREIGN PATENT DOCUMENTS

| | | |
|---|---|---|
| JP | 8-9063 | 1/1996 |
| JP | 8-98235 | 4/1996 |
| JP | 8-274888 | 10/1996 |
| JP | 8-298653 | 11/1996 |
| JP | 2002-169764 | 6/2002 |

OTHER PUBLICATIONS

European Search Report dated, Feb. 23, 2006, for related European Patent Application No. EP 05251495.7-2414.

European Search Report, issued Oct. 19, 2005, for related European Patent Application No. EP 05251495.7-2414 PCT.

Japanese Patent Office Action mailed Oct. 3, 2006 for corresponding Japanese Patent Application No. 2004-233247.

```
presenceID=FloorUser
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=speaker>
    <status>
        <basic>open</basic>
    </status>
    <contact></contact>
   <note>UserA@poc.fj.com</note>
 </tuple>
</presence>
```

FIG.4

```
presenceID=JoinUser
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=join>
    <status>
        <basic>open</basic>
    </status>
    <contact></contact>

<note>UserA@poc.fj.com,UserB@poc.fj.com</note>
 </tuple>
</presence>
```

FIG.5

```
presenceID=Member
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=member>
     <status>
          <basic>open</basic>
     </status>
     <contact></contact>

<note>UserA@poc.fj.com,UserB@poc.fj.com,UserC@poc.fj.com</note>
 </tuple>
 </presence>
```

FIG.6

```
presenceID=Priority
<presence xmlns="urn:ietf:params:xml:ns:cpim-pidf"
xmlns:fjext="urn:xmlns-fj-com:flc2002-09:pidf-status"
entity= "pres:Conference01@poc.fj.com">
 <tuple id=priority>
     <status>
          <basic>open</basic>
     </status>
     <contact></contact>
     <note>UserA@poc.fj.com</note>
 </tuple>
 </presence>
```

FIG.7

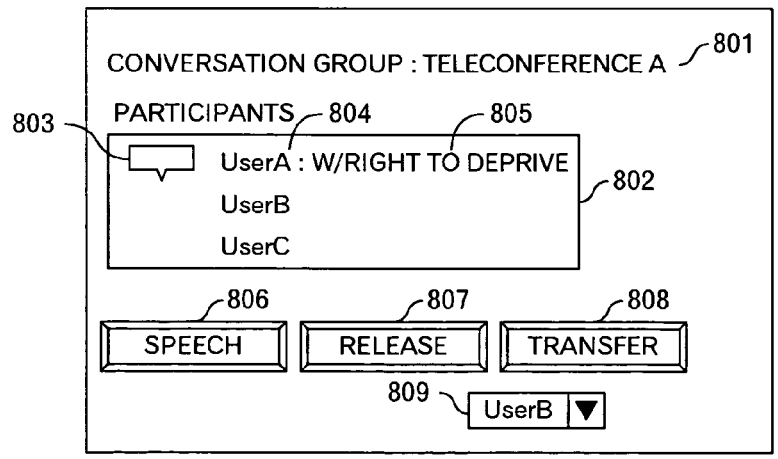

FIG.8

AUDIO TELECONFERENCE SYSTEM WITH WIRELESS COMMUNICATION PORTABLE TERMINALS

TECHNICAL FIELD OF THE INVENTION

The present invention relates to an information processing technique concerning a right to speak in an audio teleconference.

BACKGROUND OF THE INVENTION

For example, U.S. Pat. No. 5,901,363 discloses a technique concerning a group call. That is, first, a subscriber (A, B, C, D) belonging to a group call group and wishing to speak requests a speech item to a mobile exchanger through an interface. In order to solve problems caused by concurrent requests for a speech transmission turn from two subscribers, when the request for the speech item from the subscriber (A, B, C, D) is detected, priority data (B', C') specific to the request for the speech item and including the priority is generated, and the mobile exchanger switches the speech signal transmitted by that subscriber whose request for the speech item has priority data (B') of the highest priority for the other subscribers to hear.

According to such a background art as described above, although the transfer of the right to speak can be controlled, consideration is not given to the transfer of the right to speak in view of such usability that for example, a specific person who is expected to speak is made to have the right to speak, and/or the right to speak is controlled so as to avoid such a state that a specific speaker continues to have the right to speak and other group members cannot acquire the right to speak.

SUMMARY OF THE INVENTION

An object of the present invention is therefore to provide an information processing technique, which enables transfer of a right to speak in an audio teleconference in view of usability.

Besides, another object of the invention is to provide a wireless communication portable terminal including a cellular phone, which enables improvement of usability in relation to the right to speak.

According to a first aspect of the invention, an information processing method for a right to speak in an audio teleconference comprises: receiving a request for transfer of a right to speak, which includes identification information of a first user who is a transfer destination of the right to speak from a terminal of a second user; if the request for transfer of the right to speak satisfies a predetermined condition, storing the identification information of the first user as identification information of a user having the right to speak into a data storage for storing data concerning a state of the audio teleconference, which includes identification information of a user having the right to speak; and transmitting data representing that the first user has the right to speak to a terminal of the first user. As a result, the right to speak can be transferred from the second user to the first user, and flexible teleconference management becomes possible.

According to a second aspect of the invention, an information processing method comprises: if a request for acquiring a right to speak is received from a terminal of a specific user, judging whether a user having the right to speak already exists by referring to a data storage (for example, a presence data storage 512a in an embodiment, a user data storage 532a, or the like) storing data concerning a state of the audio teleconference, which includes identification information of a user having the right to speak; and if it is judged that the user having the right to speak already exists, storing identification information of the specific user into a data storage for reservation of the right to speak. Even if a user does not have the right to speak, the user can make a reservation so that the right to speak can be acquired when the right to speak is released, and whereby the usability is improved.

Furthermore, according to a third aspect of the invention, an information processing method comprises: if a request to acquire a right to speak is received from a terminal of a specific user, judging whether a user having a right to speak already exists by referring to a data storage (for example, a presence data storage 512a in an embodiment, a user data storage 532a, or the like) storing data concerning a state of the audio teleconference, which includes identification information of a user having a right to speak; if it is judged that the user having the right to speak already exists, confirming whether identification information of the specific user is stored in a priority user storage storing identification information of a user to be given priority; and if it is judged that the identification information of the specific user is stored in the priority user storage, storing the identification information of the specific user as the identification information of the user having the right to speak into the data storage. For example, if a user having a specific right such as an administrative position is registered in the priority user storage, the user having the specific right can deprive another user of the right to speak.

Moreover, according to a fourth aspect of the invention, a wireless communication portable terminal enabling an audio teleconference comprises a right-to-speak processing unit which transmits a request to acquire a right to speak to a management server of the audio teleconference if a request instruction to acquire the right to speak from a user is accepted; and a unit which activates a function (for example, a mike, a transmission processing function of audio data, and the like) for transmitting audio data of the user if the request to acquire the right to speak is transmitted. As stated above, even before a notification to notify acquisition of the right to speak is received, when the request to acquire the right to speak is transmitted, the function for transmitting the audio data is activated, and therefore, it becomes unnecessary to be silent until the acquisition of the right to speak is completed, and more smooth teleconference proceeding becomes possible. Incidentally, even if the right to speak cannot be acquired, there does not arise a problem if the audio data is discarded at the server side and is made not to be transmitted to the other user terminals.

It is possible to create a program for causing a computer to carry out the information processing method of the invention and a program to realize the wireless communication portable terminal, and the programs are stored in a storage medium or a storage device such as, for example, a flexible disk, a CD-ROM, a magneto-optical disk, a semiconductor memory, or a hard disk. Besides, the program may be distributed in digital signals through a network. Incidentally, the intermediate data in the processing is temporarily stored in a storage device such as a memory of a computer.

BRIEF DESCRIPTION OF THE DRAWINGS

FIG. 4 is a diagram showing an example of presence data in which a presence ID is "FloorUser";

FIG. 5 is a diagram showing an example of presence data in which a presence ID is "JoinUser";

FIG. 6 is a diagram showing an example of presence data in which a presence ID is "Member";

FIG. 7 is a diagram showing an example of presence data in which a presence ID is "Priority";

FIG. 8 is a diagram showing a screen example of the user terminal A;

DETAILED DESCRIPTION OF THE PREFERRED EMBODIMENTS

Figure 1:
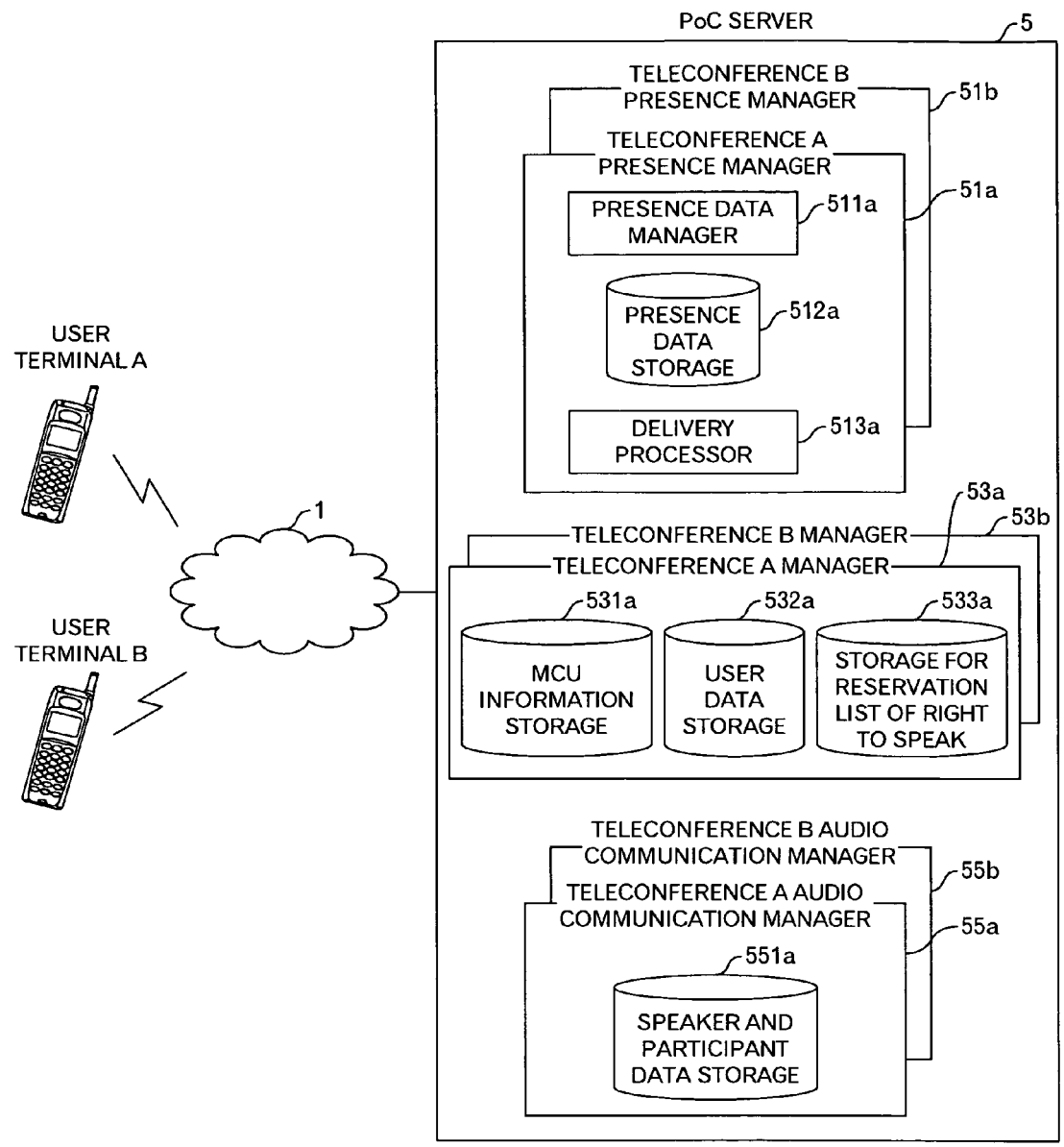
FIG. 1 is a system configuration diagram of an embodiment of the invention.

FIG. 1 is a system schematic diagram of an embodiment of the invention. A network 1 such as a portable telephone network is connected with plural portable telephones (here, a user terminal A operated by a user A and a user terminal B operated by a user B) without wires through a radio base station (not shown). The portable telephone has a voice phone function, and can also execute various application programs such as a mail client, a Web browser, and a client application in this embodiment. Incidentally, the portable telephone may be a Personal Handyphone System (PHS) terminal, and may be a portable terminal such as a Personal Digital Assistant (PDA) with a voice phone function. The user terminals A and B of this embodiment will be described later by use of a functional block diagram.

A Push-to-talk over Cellular (PoC) server 5 is also connected to the network 1. The PoC server 5 may be configured such that the functions are realized by plural computers.

The PoC server 5 is a server to carry out the control and management of teleconferences, and the routing of audio data, and includes a teleconference A presence manager 51a, a teleconference B presence manager 51b, a teleconference A manager 53a, a teleconference B manager 53b, a teleconference A audio communication manager 55a, and a teleconference B audio communication manager 55b. Here, in order to simplify the description, the description has been made on the assumption that only the teleconference A and the teleconference B exist, however, the teleconference presence managers, the teleconference managers, and the teleconference audio communication managers are respectively provided by the number of teleconferences. Besides, a presence manager of a user is also provided for each user although not shown because it is not used below, and the state of the user is delivered to users who are allowed to subscribe it.

The teleconference A presence manager 51a includes a presence data manager 511a, a presence data storage 512a, and a delivery processor 513a. The teleconference A presence manager 51a cooperates with the teleconference A manager 53a and the client application of the user terminal to update data stored in the presence data storage 512a and to carry out delivery processing of the data stored in the presence data storage 512a.

In addition, the teleconference A manager 53a manages a Multipoint Communication Unit (MCU) information storage 531a for storing an IP address and a port number of the corresponding teleconference A audio communication manager 55a and for storing information to hold a corresponding relationship with the teleconference A audio communication manager 55a, a user data storage 532a for storing a pair of a user ID (also called a subscriber ID, and more specifically, Session Initiation Protocol (SIP)—Uniform Resource Locator (URL)) such as a user called to the teleconference A, a participating user, a user holing the right to speak, and the like and an IP address, and a storage 533a for a reservation list of the right to speak to store the reservation list of the right to speak as a list of user IDs of users having made a reservation to acquire the right to speak. The teleconference A manager uses these storages and cooperates with the corresponding teleconference A presence manager 51a and the teleconference A audio communication manager 55a to carry out various processings for the teleconference A. Incidentally, the teleconference B manager 53b also has the same configuration.

The teleconference A audio communication manager 55a manages a speaker and participant data storage 551a for storing a pair of a user ID and an IP address of a user holding the right to speak and participating users, and uses these storage to carry out a processing to transfer audio data received from the user terminal of the user having the right to speak in the teleconference A to the user terminals of the participants of the teleconference A.

Figure 2:
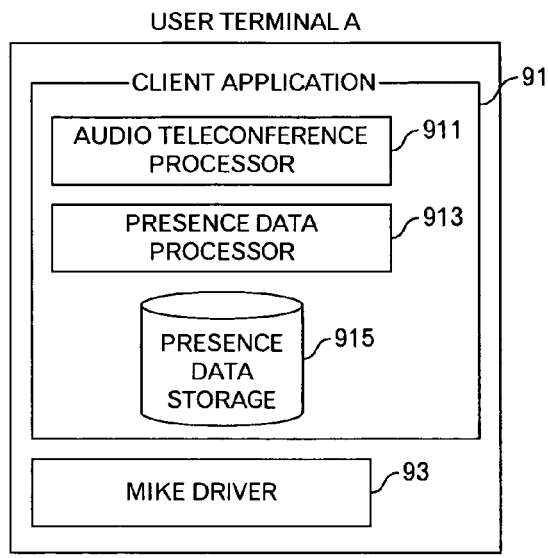
FIG. 2 is a functional block diagram of a user terminal A.

Next, a functional block diagram of the user terminal A is shown in FIG. 2. The user terminal A includes a client application 91 for performing a processing in this embodiment, and a mike driver 93 for a mike provided in the user terminal. The client application 91 includes an audio teleconference processor 911 for performing a control processing of a teleconference, a presence data processor 913, and a presence data storage 915. Incidentally, functions not directly relevant to this embodiment are not shown.

Figure 3:
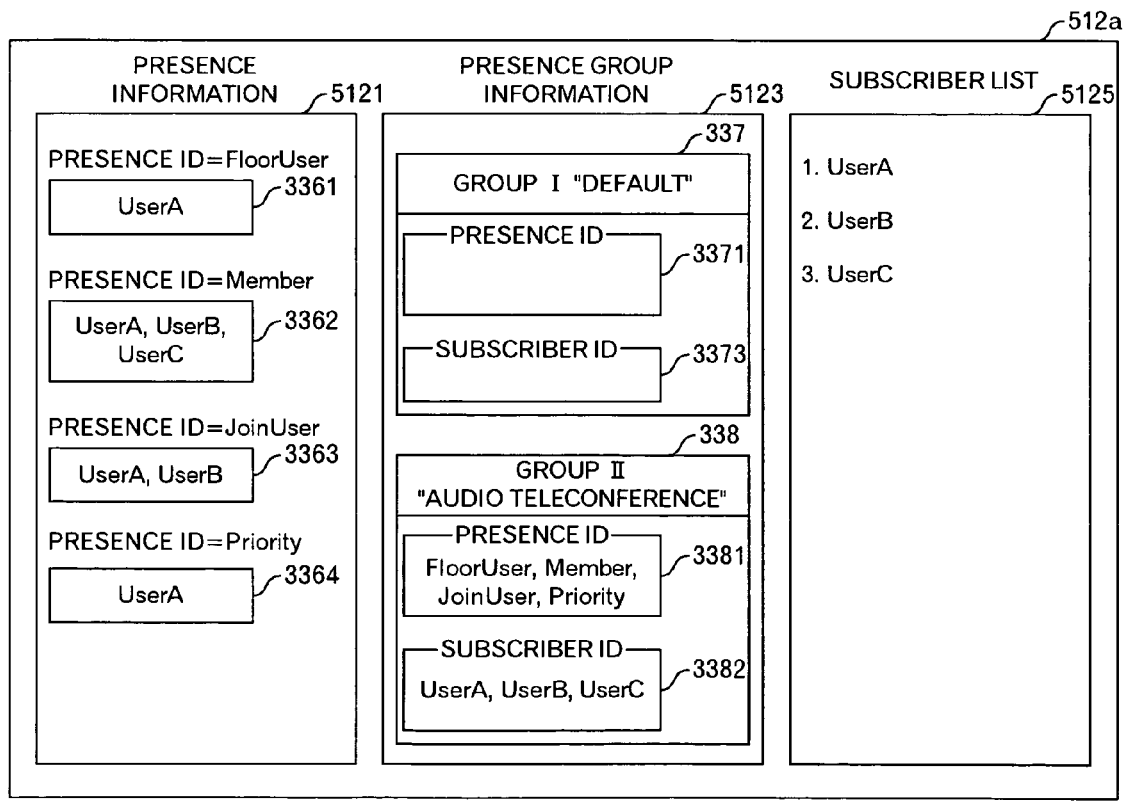
FIG. 3 is a diagram showing an example of data stored in a presence data storage of a PoC server.

FIG. 3 shows an example of data stored in the presence data storage 512a included in the teleconference A presence manager 51a. In the example of FIG. 3, it includes a presence information storage area 5121, a presence group information storage area 5123, and a subscriber list storage area 5125. The presence information storage area 5121 includes an area 3361 for storing presence data (here, a subscriber ID of a user having the right to speak (also called speaker right)) in which a presence ID, which is an ID of a presence data item, is "FloorUser", an area 3362 for storing presence data (here, subscriber IDs of users called to the teleconference) in which a presence ID is "Member", an area 3363 for storing presence data (here, subscriber IDs of users having participated in the teleconference) in which a presence ID is "JoinUser", and an area 3364 for storing presence data (here, a subscriber ID of a user having a right (preferential usage right of the right to speak) to deprive the right to speak) in which a presence ID is "Priority".

Besides, the presence group information storage area 5123 includes an area 337 having an area 3371 for storing presence IDs belonging to a group I "default" as a presence group and an area 3373 for storing user IDs (that is, subscriber IDs), and an area 338 having an area 3381 for storing presence IDs belonging to a group II "audio teleconference" as a presence group and an area 3382 for storing user IDs (that is, subscriber IDs). The subscriber ID of the user participating in the audio teleconference is stored in the area 3382, and data disclosed to the user participating in the audio teleconference is the presence data whose presence IDs are "FloorUser", "Member", "JoinUser" and "Priority". That is, there are exhibited the subscriber ID of a person holding the right to speak, the subscriber ID list of called users, the subscriber ID list of participating users, and the subscriber ID of the user having the right to deprive the right to speak.

FIG. 3 schematically shows data stored in the presence data storage, and for example, data with a tag data structure as shown in FIG. 4 is stored in the area 3361 for the presence data whose presence ID is "FloorUser". An example of FIG. 4 is basically described by using extensible Markup Language (XML) in conformity with Open Mobile Alliance (OMA). Here, it should be noted that at the fourth line from the top, in the phrase of entity="pres:Conference01@poc.fj.com", the owner of the presence data whose presence ID is "FloorUser" is specified by the SIP-URL of Conference01@poc.fj.com. Here, the owner of this presence data is the teleconference A manager 53a of the PoC server 5, and the presence data is updated by the teleconference A manager 53a. Besides, the SIP-URL of the teleconference A manager 53a is Conference01@poc.fj.com. Further, between <note> and </note> tags, the SIP-URL "UserA@poc.fj.com" is registered as the user ID of a user holding the right to speak. In FIG. 3, "UserA@poc.fj.com" is simplified to be denoted by "UserA".

Similarly, for example, data with a tag data structure as shown in FIG. 5 is stored in the area 3363 for the presence data whose presence ID is "JoinUser". In the example of FIG. 5, similarly to FIG. 4, the owner of the presence data is specified by the SIP-URL of Conference01@poc.fj.com, and between <note> and </note> tags, the SIP-URLs "UserA@poc.fj.com, userB@poc.fj.com" of the participants of the audio teleconference are registered as the user IDs.

Furthermore, for example, data with a tag data structure as shown in FIG. 6 is stored in the area 3362 for the presence data whose presence ID is "Member". Similarly to FIG. 4, in the example of FIG. 6, the owner of the presence data is specified by the SIP-URL of Conference01@poc.fj.com, and between <note> and </note> tags, the SIP-URLs "UserA@poc.fj.com, UserB@poc.fj.com, UserC@poc.fj.com" of the users called to the audio teleconference are registered as the user IDs.

Besides, for example, data with a tag data structure as shown in FIG. 7 is stored in the area 3364 for the presence data whose presence ID is "Priority". In the example of FIG. 7, similarly to FIG. 4, the owner of the presence data is specified by the SIP-URL of Conference01@poc.fj.com, and between <note> and </note> tags, the SIP-URL "UserA@poc.fj.com" of the user having the right to deprive the right to speak is registered as the user ID.

The presence data is basically updated by the owner, and when updated, the updated presence data is delivered by the delivery processor to the user of the user ID to which the presence ID of the presence data is correlated.

Next, a processing flow of the system shown in FIG. 1 will be described with reference to FIGS. 9 to 13. Incidentally, it is presupposed that users who are expected to participate in a teleconference are already specified by, for example, a user A, and the user IDs of the specified users are registered in the area 3362 for the presence data whose presence ID is "Member". Furthermore, the specified users are called to the teleconference, and with respect to the users having made a participation response, it is presupposed that the user IDs are registered in the area 3363 for the presence data whose presence ID is "JoinUser". Then, with respect to such a participant that for example, an "administrative position" is registered as an attribute of the participant in a not-shown user DB (for example, a DB storing the user attribute information together with the user ID and password to log in to the PoC server 5), it is presupposed that the user ID is registered in the area 3364 for the presence data whose presence ID is "Priority". Various setting can be made according to the mode of the teleconference, for example, the right to deprive is given to only the user having the highest position in the "administrative positions", the right to deprive is set based on other standards, the right to deprive is set for plural users, or the right to deprive is not set.

Furthermore, it is presupposed that the IP address and port number used by the corresponding teleconference A audio communication manager 55a are already stored in the MCU information storage 531a, and the user IDs and IP addresses of the called users, the participating users and the user holding the right to speak are registered in the user data storage 532a. There is also a case where the user ID of the user having the right to deprive the right to speak is registered. Furthermore, it is presupposed that the user IDs and IP addresses of the user holding the right to speak and the participating users are registered in the speaker and participant data storage 551a.

Besides, it is presupposed that the audio teleconference processor 911 of the client application 91 in the user terminal A receives the IP address and port number of the teleconference A audio communication manager 55a as the reply of the participation response to the teleconference A or the like, and stores them in a storage device such as a main memory.

For example, if the data as shown in FIG. 3 is stored in the presence data storage 512a, because the delivery processor 513a of the teleconference A presence manager 51a delivers the presence data shown in FIG. 3 to the user terminals of the participating users, a screen as shown in FIG. 8 is displayed on a display device of the user terminal by the presence data processor 913 of the user terminal. In the screen example of FIG. 8, a display column 801 of a conversation group is provided, and it is indicated that the teleconference A is being performed. Besides, a display column 802 of a participating user is provided, and in a column 804 of a participating user, it is indicated that User A, User B and User C participate in the teleconference A. Further, a participating user holding the right to speak is associated with a mark 803 indicating holding the right to speak. In the example of FIG. 8, the User A has the right to speak at present. Besides, a participating user having the right to deprive the right to speak is associated with a display 805 indicating the existence of the right to deprive. Further, there are included a speech button 806 for causing to transmit a request to acquire the right to speak, a release button 807 for causing to transmit a request to release the right to speak, a transfer button 808 for causing to transfer the right to speak, and a combo box 809 for specifying a transfer destination user of the right to speak. Incidentally, because there are many scenes to issue the request to acquire the right to speak, for example, a button may be separately provided as hardware on the user terminal. The same may be applied to the other buttons. The screen configuration of FIG. 8 is one example, and it is also possible to adopt another screen configuration to display the same contents. However, in the following processing flow, the description will be made on the premise that the screen as shown in FIG. 8 is displayed except that the holder of the right to speak is changed.

For example, when the user A whose user ID is UserA operates the user terminal A and does not have the right to speak, but desires to acquire the right to speak in order to speak to other participants, the user presses the speech button 806. Then, the audio teleconference processor 911 of the client application 91 in the user terminal A accepts an instruction to acquire the right to speak from the user A (FIG. 9: step S1), and refers to the presence data storage 915 to judge whether a person having the right to speak exists at present (step S3). Also as described above, when receiving the newest presence data from the delivery processor 513*a* of the teleconference A presence manager 51*a* in the PoC server 5, the presence data processor 913 changes the display shown in FIG. 8 and stores the data into the presence data storage 915. Accordingly, by referring to the presence data storage 915, it is possible to tentatively judge whether the right to speak is held at present. However, because the update of the presence data storage 915 has a time lag from the update of the presence data storage 512*a* of the teleconference A presence manager 51*a* in the PoC server 5, it is not necessarily newest.

In a case where it is judged that there is no person having the right to speak at present, the audio teleconference processor 911 transmits a request to acquire the right to speak including the user ID of the user A as the requesting user to the PoC server 5 (step S5). Further, the audio teleconference processor 911 activates the mike driver 93 to enable the audio input by the user A (step S7). As stated above, the mike driver 93 is activated before the notice of the acquisition of the right to speak is received from the PoC server 5, so that the user A can start to speak immediately after the input of the request to acquire the right to speak. However, at this stage, there is no guarantee that the right to speak is acquired, and it is not definite whether the spoken contents are transmitted to the other participating users. However, if the right to speak can be immediately acquired, it becomes possible to expedite proceedings without interruption. Thereafter, the processing proceeds to FIG. 10 through terminal A.

On the other hand, when receiving the request to acquire the right to speak including the user ID of the user A from the user terminal A (step S9), the teleconference A manager 53*a* of the PoC server 5 refers to, for example, the user data storage 532*a* or the presence data storage 512*a* to judge whether another participating user has the right to speak (step S11). When there is no participating user having the right to speak, the teleconference A manager 53*a* registers UserA as the user ID of the user holding the right to speak into the user data storage 532*a*, and carries out such a processing for acquiring the right to speak as to request the presence data manager 511*a* of the teleconference A presence manager 51*a* to register UserA into the area 3361 for storing the presence data whose presence ID is "FloorUser" in the presence data storage 512*a*, and further as to request the teleconference A audio communication manager 55*a* to register UserA as the user ID of the user having the right to speak into the speaker and participant data storage 551*a* (step S13). The processing proceeds to FIG. 10 or FIG. 11 through terminal B.

On the other hand, in the case where another user having the right to speak exists, the teleconference A manager 53*a* refers to, for example, the user data storage 532*a* or the presence data storage 512*a* to judge whether the requesting user has the right to deprive the right to speak (step S15). In a case where it is judged that the user as the requesting user has the right to deprive the right to speak, the processing proceeds to step S13. That is, the processing to acquire the right to speak is carried out, and the right to speak is set for the requesting user. On the other hand, in a case where it is judged that the requesting user does not have the right to deprive the right to speak, the teleconference A manager 53*a* registers the user ID of the requester user into the storage 533*a* for the reservation list of the right to speak (step S17). As stated above, the requesting user is additionally registered into the reservation list of the right to speak, so that in the case where the right to speak is released, the right to speak is transferred to the user registered at the highest rank in the reservation list of the right to speak. The teleconference A manager 53*a* transmits a reservation completion notice to the user terminal A (step S19). The audio teleconference processor 911 of the client application 91 in the user terminal A receives the reservation completion notice from the Poc server 5, and displays it on a display device (step S21). Then, the mike driver 93 activated at the step S7 is made inactive (step S23).

In this embodiment, although the reservation list of the right to speak is managed by the teleconference A manager 53*a*, for example, the reservation list of the right to speak may be registered as the presence data in the presence data storage 512*a*. Then, the reservation list of the right to speak can also be delivered to all participating users by the delivery processor 513*a*.

Further, the reservation of the right to speak does not necessarily have to be accepted. In a case where the reservation of the right to speak is not accepted, when it is judged at the step S15 that there is no right to deprive, the teleconference A manager 53*a* transmits an unacceptance notice of the acquisition of the right to speak to the user terminal A. The user terminal A having received the unacceptance notice of the acquisition of the right to speak displays the notice on the display device, and makes the mike driver 93 inactive.

Besides, at the step S3, in the case where it is judged that there is another user having the right to speak at present, the audio teleconference processor 911 refers to the presence data storage 915 to judge whether the user A of the user who are requesting to acquire the right to speak has the right to deprive the right to speak (step S25). In the case where it is judged that the user has the right to deprive, the processing proceeds to the step S5. On the other hand, in the case where it is judged that the user does not have the right to deprive, the audio teleconference processor 911 displays the unacceptance notice of the acquisition of the right to speak on the display device, and the processing returns to the state of receiving audio data (step S27).

As stated above, when the request to acquire the right to speak is transmitted only in the case where anyone does not have the right to speak and in the case where the user has the right to deprive the right to speak, it is possible to prevent the communication bandwidth in the wireless communication section from being wastefully used. However, it is possible to transmit the request to acquire the right to speak to the PoC server 5 in accordance with the instruction from the user without limiting the transmission of the request to acquire the right to speak at the user terminal side.

Next, a processing after the terminals A and B will be described with reference to FIG. 10. Because the mike driver 93 is activated at the step S7, at the step S7 and the subsequent steps, the user terminal A can accept the audio input of the user A and can transmit the input audio data to the PoC server 5 (step S31). At this time, the audio data inputted through the mike and the mike driver 93 is transmitted as audio packets to the IP address and port number of the teleconference A audio communication manager 55*a*.

When receiving the audio data from the user terminal A (step S33), the teleconference A audio communication manager 55a of the PoC server 5 refers to the speaker and participant data storage 551a or the presence data storage 512a to judge whether the user operating the user terminal A has the right to speak (step S35). In a case where it is judged that the user operating the user terminal A does not have the right to speak, the processing proceeds to FIG. 11 through terminal C. On the other hand, in a case where it is judged that the user operating the user terminal A has the right to speak, it copies and transfers the received audio data in accordance with the IP addresses of the user terminals of the participating users stored in the speaker and participant data storage 551a (step S37). Here, the audio data is transmitted to the user terminal B. Although it is better not to transmit the data to the user terminal of the user having the right to speak, the data may be transmitted. When receiving the audio data from the PoC server 5, the user terminal B outputs a voice through a not-shown speaker driver and speaker (step S39).

Figure 9:
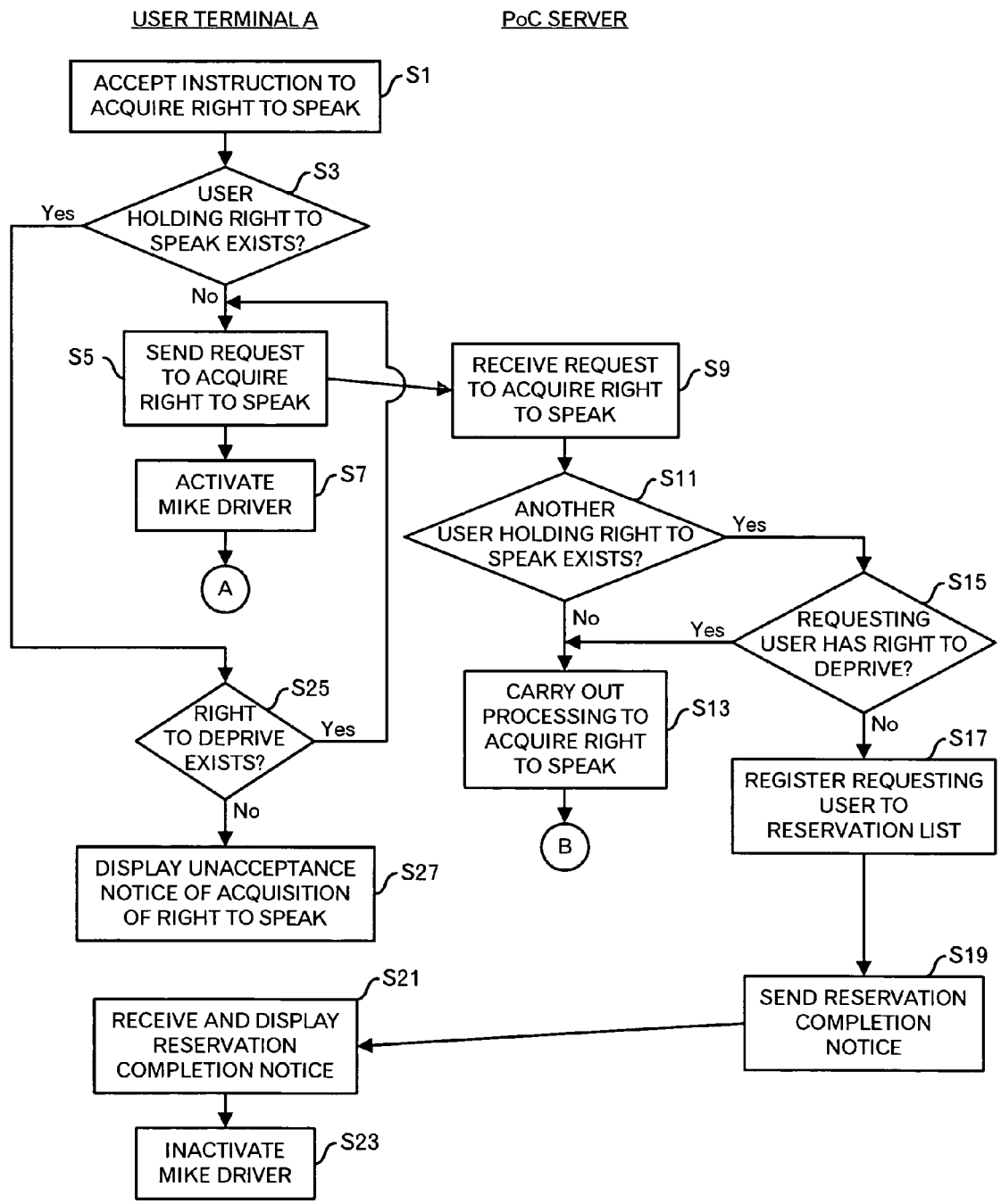
FIG. 9 is a diagram showing a processing flow in the embodiment.
Figure 10:
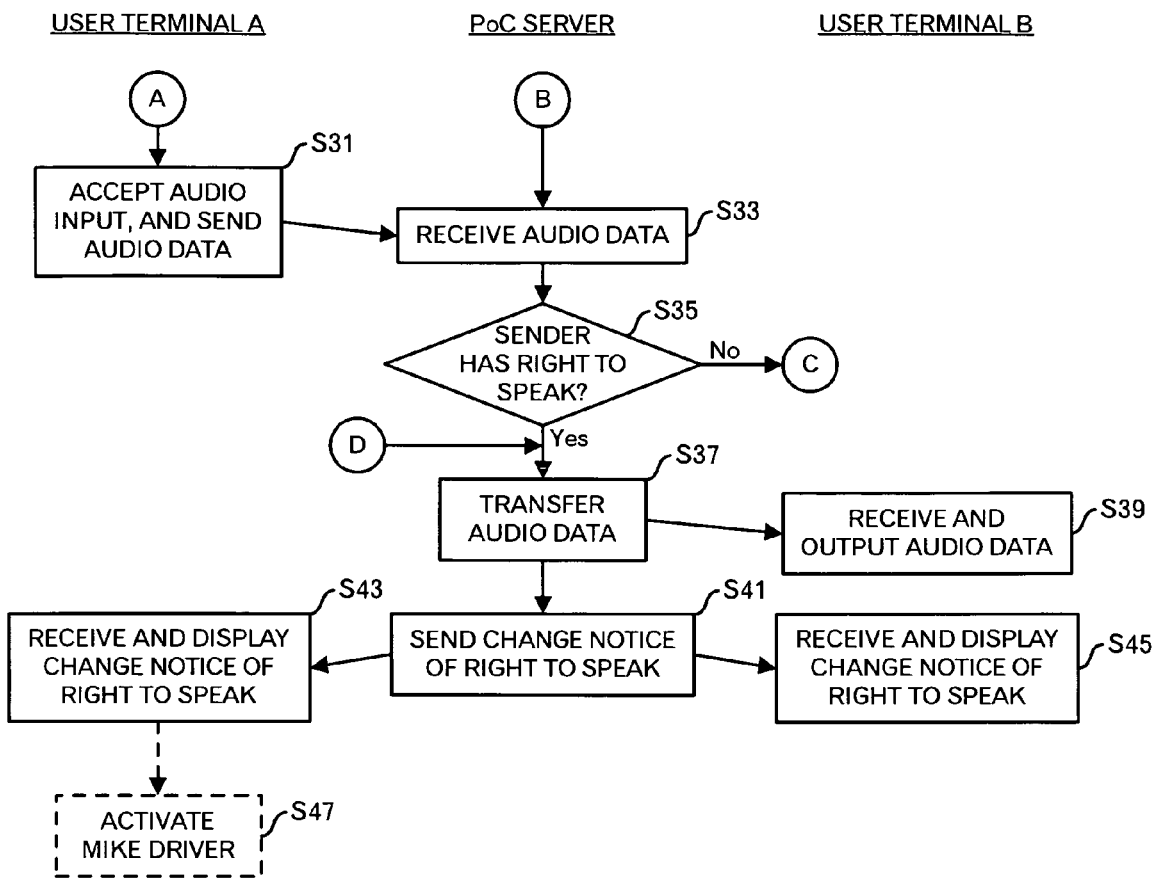
FIG. 10 is a diagram showing the processing flow in the embodiment.

Incidentally, although it is performed after the step S37 in FIG. 10, because the presence data storage 512a has been updated at the step S13, at any timing after the step S13 of FIG. 9, the delivery processor 513a of the teleconference A presence manager 51a transmits the updated presence data as a change notice of the right to speak to the user terminals of the participating users (step S41). The presence data processor 913 of the client application 91 in the user terminal A and the user terminal B receives the updated presence data as the change notice of the right to speak from the PoC server 5, overwrites and registers it in the presence data storage 915, and displays it on the display device (step S43 and S45). As a result, all participating users of the teleconference A can recognize that the user A holds the right to speak.

Incidentally, although the mike driver 93 is activated at the step S7, according to circumstances, the mike driver 93 may be activated after the step S43 (step S47). In this way, because it is definite from the change notice of the right to speak that the right to speak is acquired, the audio data is not wastefully transmitted to the PoC server 5.

Figure 11:
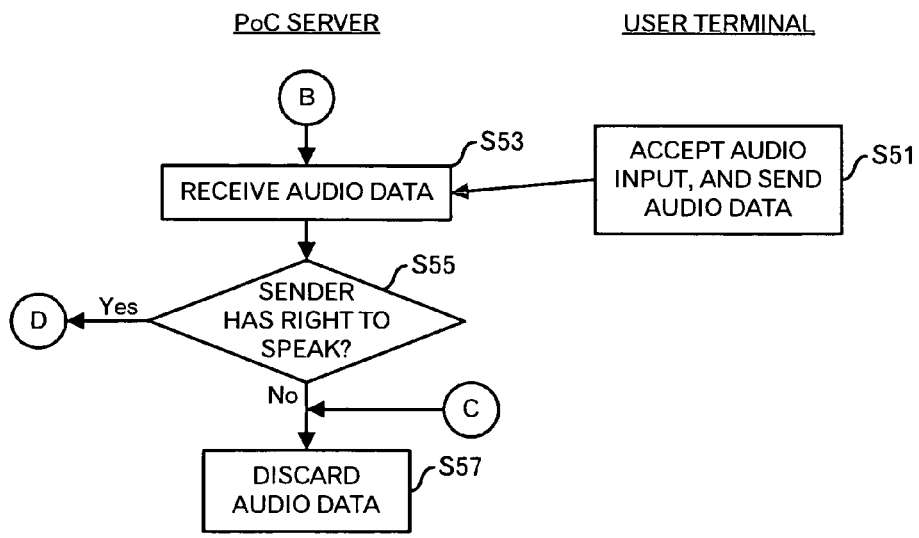
FIG. 11 is a diagram showing the processing flow in the embodiment.

Next, another processing after the terminal B will be described with reference to FIG. 11. As described above, because the right to speak is set for the teleconference, even if the audio data is received from the user terminal (here, the user terminal B) of the user having no right to speak, the audio data cannot be transmitted to the other user terminals. For example, in a case where the user terminal B transmits the request to acquire the right to speak to the PoC server 5 slightly later than the user terminal A because there is no right to speak holder at present, a reservation for the right to speak is made at the step S17 through the steps S11 and S15 of FIG. 9. However, because the mike driver 93 is activated at the step S7 after the step S5, the audio input by the user B is possible, and when the user B starts to speak, the user terminal B accepts the audio input through the mike and the mike driver 93, and transmits the audio data to the PoC server 5 (step S51). When the audio data is sent to the PoC server 5 as usual, the teleconference A audio communication manager 55a of the PoC server 5 receives the audio data (step S53), and refers to the speaker and participant data storage 551a or the presence data storage 512a to judge whether the user as the transmission source user of the audio packet has the right to speak (step S55). As described above, because the user B as the transmission source user of the audio packet does not have the right to speak, the audio packet received at the step S53 is discarded at this stage (step S57). That is, the audio packet is not transmitted to the user terminals of the other participating users. Although it is impossible in the above example, in the case where the user B has the right to speak (step S55: Yes route), the processing proceeds to the step S37 of FIG. 10 through a terminal D.

As stated above, the processing related to the acquisition of the right to speak is carried out, so that the participating users can use the useful functions such as the reservation of the right to speak and the deprivation of the right to speak. Besides, because the audio data can be transmitted even in the state where the acquisition of the right to speak cannot be confirmed, if the right to speak can be acquired immediately, smooth management of proceedings becomes possible. Incidentally, also in the case where the right to speak cannot be acquired, because the audio data is discarded by the PoC server 5, the teleconference proceeds without a problem. Besides, when a specific limitations are placed on the transmission of the request to acquire the right to speak, which is carried out most frequently in the user terminals, the communication bandwidth of the wireless communication section can be effectively used.

Figure 12:
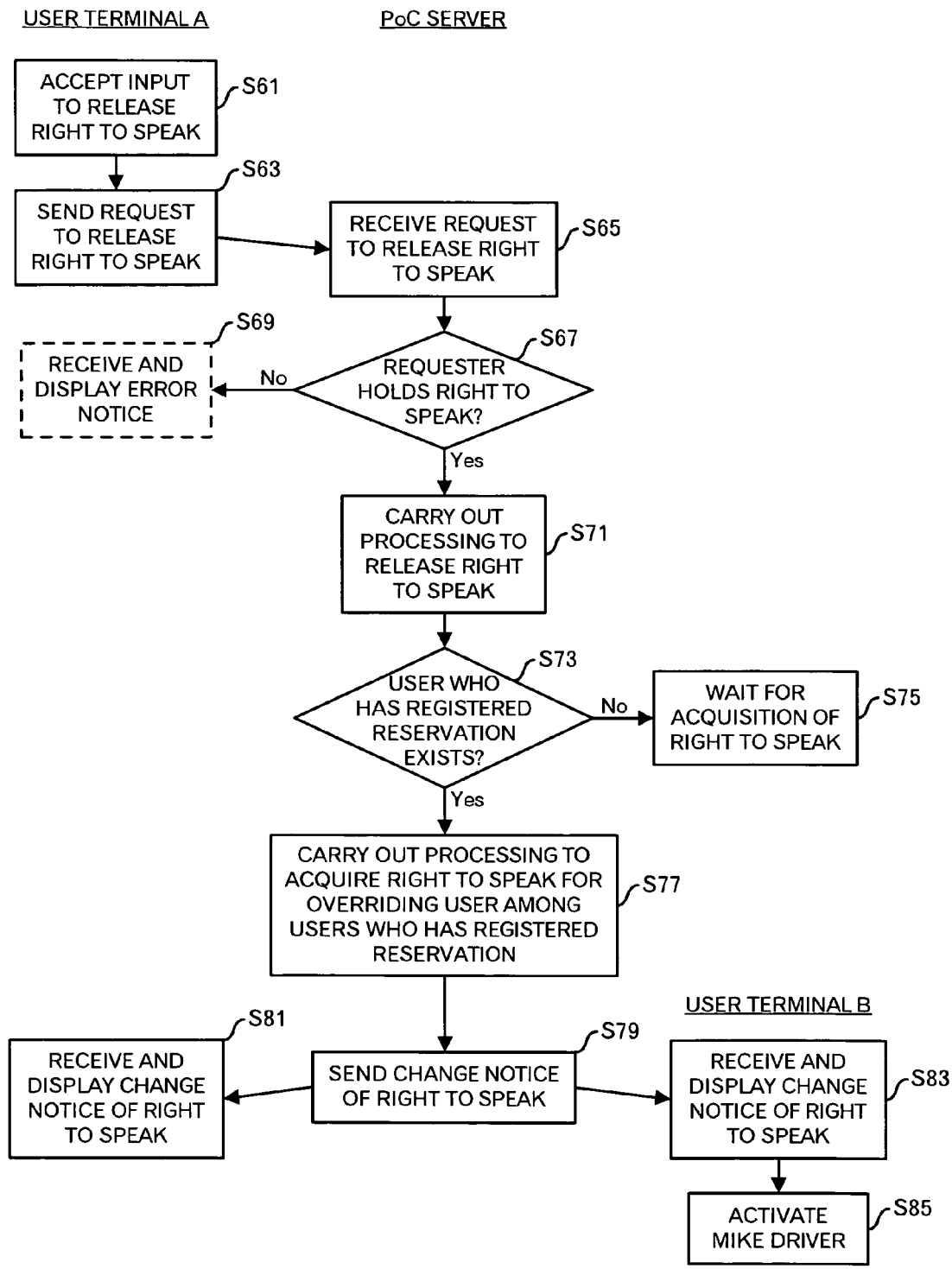
FIG. 12 is a diagram showing the processing flow in the embodiment.

Next, the treatment of the reservation to acquire the right to speak, together with the release of the right to speak, will be described with reference to FIG. 12. For example, it is assumed that the user A of the user terminal A is the holder of the right to speak, and the user B of the user terminal B is the user who has made a reservation to acquire the right to speak, that is, the user registered in the storage 533a for the reservation list of the right to speak.

For example, on the display screen as shown in FIG. 8, when the user A presses the release button 807, the audio teleconference processor 911 of the user terminal A accepts the release input of the right to speak (step S61), and transmits the request to release the right to speak including the user ID of the user A (step S63). The teleconference A manager 53a of the PoC server 5 receives the request to release the right to speak including the user ID of the user A from the user terminal A (step S65). Then, the teleconference A manager 53a refers to the user data storage 532a or the presence data storage 512a to judge whether the requesting user of the request to release the right to speak has the right to speak (step S67). This is because in a case where the right to speak is deprived, there is a case where the user mistakenly considers that he or she holds the right to speak yet. In the case where the user requests to release the right to speak although he or she does not have the right to speak, it generates an error notice and transmits the notice to the user terminal A. When receiving the error notice from the PoC server 5, the audio teleconference processor 911 of the client application 91 in the user terminal A displays the notice on the display device (step S69). As a result, it is possible to confirm that the user does not hold the right to speak. On the other hand, in a case where the requesting user of the request to release the right to speak has the right to speak, the teleconference A manager 53a carries out such a processing to release the right to speak as to register "none" as the user holding the right to speak in the user data storage 532a, as to request the presence data manager 511a of the teleconference A presence manager 51a to register "none" into the area 3361 for storing the presence data whose presence ID is "FloorUser" in the presence data storage 512a, and further as to request the teleconference A audio communication manager 55a to register "none" as the user ID of the user holding the right to speak into the speaker and participant data storage 551a (step S71). As a result, the state of the teleconference is changed into the state in which any participating users do not have the right to speak.

Besides, the teleconference A manager 53a refers to the storage 533a of the reservation list of the right to speak to judge whether there is a user who has registered the reservation of the right to speak (step S73). In a case where any users are not stored in the storage 533a of the reservation list of the right to speak, the processing proceeds to a waiting state of the acquisition of the right to speak (step S75).

On the other hand, in the case where there is a user who has registered the reservation of the right to speak, for the overriding user (here, the user B (the user ID is UserB)) among the users who has registered the reservation, the teleconference A manager 53a carries out such a processing to release the right to speak as to register User B as the user ID of the user holding the right to speak into the user data storage 532a, as to request the presence data manager 511a of the teleconference A presence manager 51a to register UserB into the area 3361 for storing the presence data whose presence ID is "FloorUser" in the presence data storage 512a, and further as to request the teleconference A audio communication manager 55a to register UserB as the user ID of the user holding the right to speak into the speaker and participant data storage 551a (step S77). Incidentally, the overriding user may be the user registered in the storage 533a of the reservation list of the right to speak earliest, or the user who has least acquired the right to speak. In the latter case, in the teleconference A manager 53a, it is necessary to count the number of times of acquisition of the right to speak by each participating user.

As a result, the right to speak is automatically transferred to the user who has made the reservation of the right to speak.

Besides, because the presence data storage 512a is updated, the delivery processor 513a of the teleconference A presence manager 51a transmits the updated presence data as the change notice of the right to speak to the user terminals of the participating users such as the user terminal A and the user terminal B (step S79). The presence data processor 913 of each of the user terminal A and the user terminal B receives the updated presence data as the change notice of the right to speak, stores it in the presence data storage 915, and displays it on the display device (steps S81 and S83). Incidentally, the audio teleconference processor 911 refers to the presence data storage 915, confirms whether its own user holds the right to speak, and activates the mike driver 93 in the case where it is judged that its own user holds the right to speak (step S85). As a result, the user B operating the user terminal B can deliver the audio data to the user terminals of the other participating users.

Figure 13:
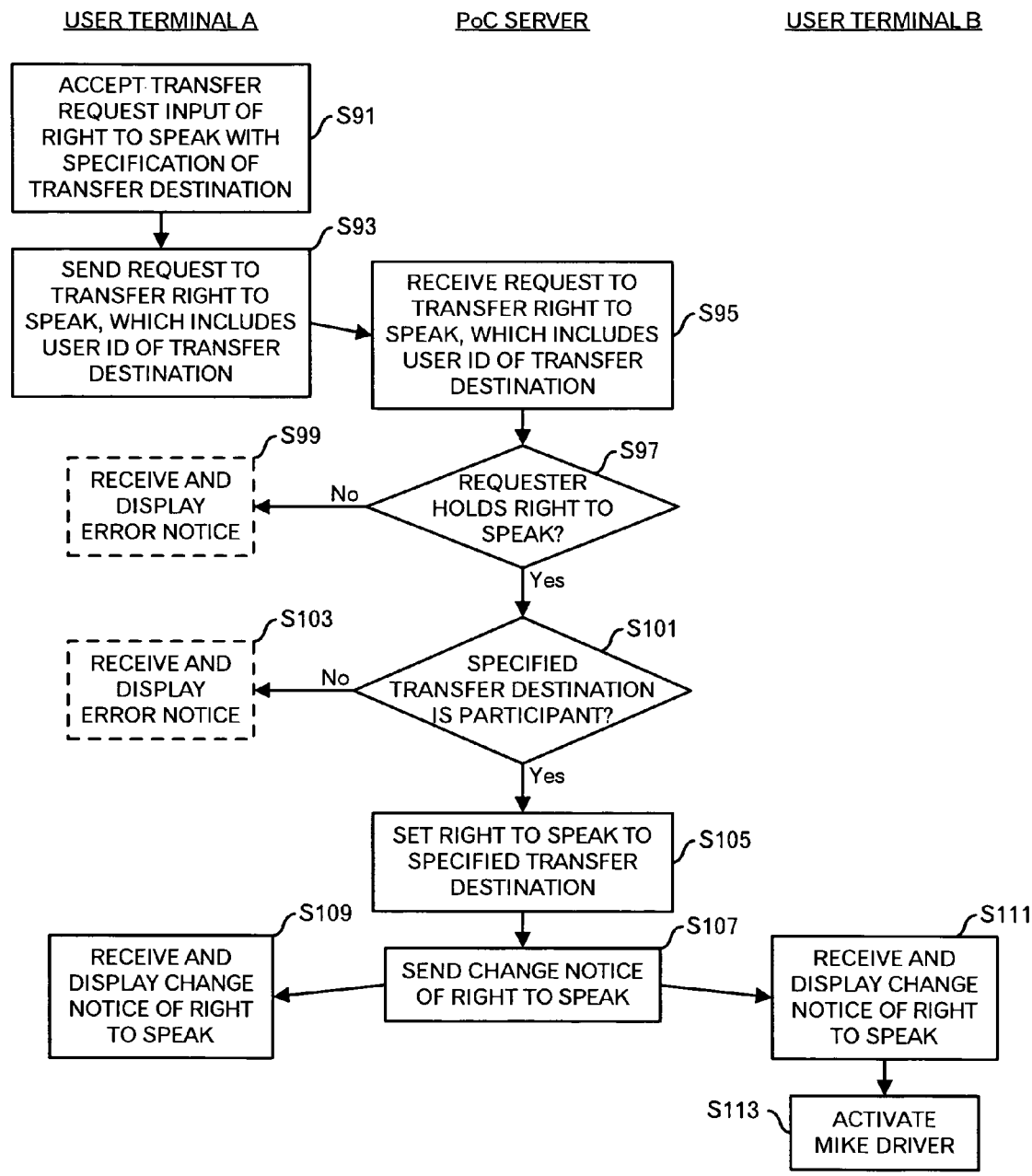
FIG. 13 is a diagram showing the processing flow in the embodiment.

Next, a processing flow for realizing transfer of the right to speak will be described with reference to FIG. 13. Incidentally, the description will be given to a case where the user A holds the right to speak and transfers the right to speak to the user B. First, for example, the user A specifies the user B (UserB) as the transfer destination of the right to speak in the combo box 809 of FIG. 8 and presses the transfer button 808. Then, the audio teleconference processor 911 of the client application 91 in the user terminal A accepts the transfer request input of the right to speak with the specification of the user B as the transfer destination (step S91), and transmits a request to transfer the right to speak, including the user ID of the transfer destination to the PoC server 5 (step S93).

The teleconference A manager 53a of the PoC server 5 receives the request to transfer the right to speak, including the user ID of the transfer destination from the user terminal A (step S95). Then, the teleconference A manager 53a refers to the user data storage 532a or the presence data storage 512a to judge whether the user requesting to transfer the right to speak has the right to speak (step S97). In a case where the transfer of the right to speak is requested although the user does not have the right to speak, it generates an error notice and transmits the notice to the user terminal A. The audio teleconference processor 911 of the client application 91 in the user terminal A receives the error notice from the PoC server 5, and displays the notice on the display device (step S99).

On the other hand, in the case where it is judged that the user requesting the transfer of the right to speak has the right to speak, the teleconference A manager 53a refers to the user data storage 532a or the presence data storage 512a to judge whether the specified transfer destination user is specified as the participant (step S101). On the screen of FIG. 8 displayed on the user terminal A, because the combo box 809 is configured in accordance with the list of participating users in the presence data storage 915, in general, the participating user is specified as the transfer destination. However, actually, because there is a time lag between update of the presence data storage 512a and update of the presence data storage 915, there is also a case where for example, a participating user takes a train or moves to a place where a radio signal cannot be received, and then becomes not the participant before the presence data storage 915 is updated. Accordingly, at this step, it is confirmed whether the user is the participant. In a case where it is judged that the user of the specified transfer destination is not the participant, the teleconference A manager 53a generates an error notice, and transmits it to the user terminal A. The audio teleconference processor 911 of the client application 91 in the user terminal A receives the error notice from the PoC server 5, and displays it on the display device (step S103).

On the other hand, in the case where it is judged that the user of the specified transfer destination is the participant, the teleconference A manager 53a carries out a processing of setting the right to speak for the specified transfer destination in such a way as to register the user ID "UserB" of the specified transfer destination user as the user ID of the user holding the right to speak into the user data storage 532a, as to request the presence data manager 511a of the teleconference A presence manager 51a to register UserB into the area 3361 for storing the presence data whose presence ID is "FloorUser" in the presence data storage 512a, and further as to request the teleconference A audio communication manager 55a to register UserB as the user ID of the user holding the right to speak into the speaker and participant data storage 551a (step S105). As a result, the right to speak is set for the user B, and the setting intended by the user A is realized in the PoC server 5.

Besides, because the presence data storage 512a is updated, the delivery processor 513a of the teleconference A presence manager 51a transmits the updated presence data as the change notice of the right to speak to the user terminals of the participating users such as the user terminal A and the user terminal B (step S107). The presence data processor 913 of the user terminal A and the user terminal B receives the updated presence data as the change notice of the right to speak, stores it into the presence data storage 915, and displays it on the display device (step S109 and S111). Incidentally, the audio teleconference processor 911 refers to the presence data storage 915, confirms whether its own user holds the right to speak, and activates the mike driver 93 in the case where it is judged that its own user holds the right to speak (step S113). As a result, the user B operating the user terminal B can deliver the audio data to the user terminals of the other participating users.

Although the embodiment of the invention has been described, the invention is not limited to this. Although described above, there is also a case where the PoC server 5 is realized by plural computers. In that case, there is also a case where the server is divided into, for example, a server including the presence manager of the teleconference, a server including the manager of the teleconference, and a server including the audio communication manager of the teleconference. In the case as stated above, for example, the server including the presence manager of the teleconference accepts the communication other than the audio data from the user terminals, and may transfer received data to the server including the manager of the teleconference as the need arises. The server including the manager of the teleconference controls and manages the other servers.

Besides, the functional blocks shown in FIG. 1 do not necessarily correspond to actual program modules.

Figure 14:
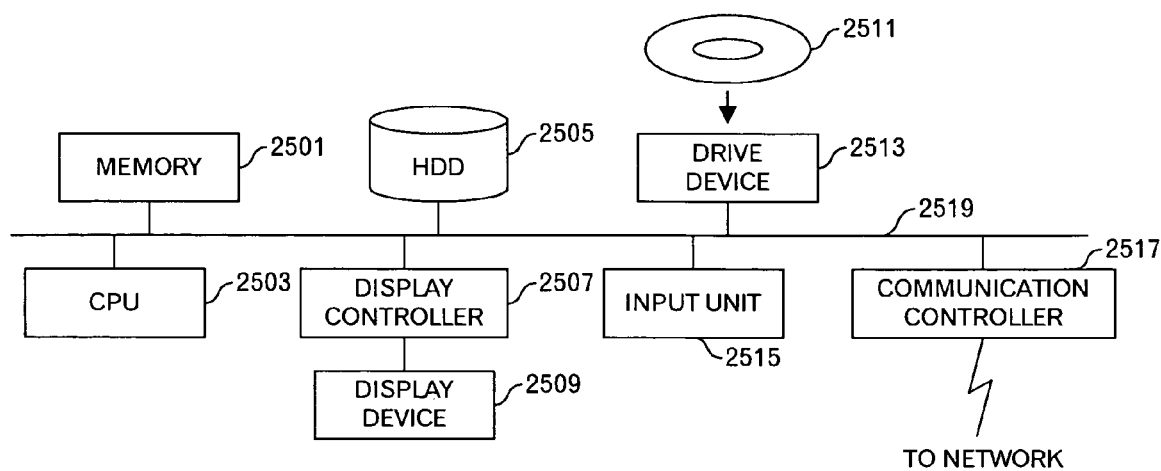
FIG. 14 is a functional block diagram of a computer including a PoC server.

Incidentally, the PoC server 5 is a computer, and the computer has a configuration as shown in FIG. 14. That is, a memory 2501, a CPU 2503, a hard disk drive (HDD) 2505, a display controller 2507 connected to a display device 2509, a drive device 2513 for a removal disk 2511, an input device 2515, and a communication controller 2517 for connection with a network are connected through a bus 2519. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operation. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Besides, as for the user terminal, it is possible represent it by the almost similar configuration in which the HDD 2505 and the drive device 2509 are replaced with a storage device such as a flash memory.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method for a right of users to speak in an audio teleconference, said information processing method comprising:

receiving a request to transfer said right to speak, which includes identification information of a first user who is a transfer destination of said right to speak, from a terminal of a second user;

judging, by referring to a data storage that stores state data concerning a state of said audio teleconference, said state data including participant data regarding the users participating in said audio teleconference and right-to-speak information indicating which of the users has said right to speak, whether a first condition that said identification information of said first user is included in the participant data, and a second condition that indentification information of said second user is identical to the right-to-speak information, are satisfied;

upon detecting that said first condition and said second condition are satisfied, storing said identification information of said first user as the right-to-speak information in said data storage storing said state data; and transmitting data representing that said first user has said right to speak to a terminal of said first user.

2. The information processing method as set forth in claim 1, wherein said state data is managed as presence data, and said transmitting is carried out as a notifying update of said presence data.

3. An information processing method for a right to speak in an audio teleconference, said information processing method comprising:

if a request to acquire said right to speak is received from a terminal of a specific user, judging whether a user having said right to speak already exists by referring to a data storage storing state data concerning a state of said audio teleconference, said state data including identification information of said user having said right to speak;

if it is judged that said user having said right to speak already exists, confirming whether identification information of said specific user is stored in a priority user storage storing identification information of a user to be given priority; and if it is judged that said identification information of said specific user is stored in said priority user storage, storing said identification information of said specific user as said identification information of said user having said right to speak into said data storage without receiving a request to release said right to speak from said user having said right to speak.

4. The information processing method as set forth in claim 3, further comprising transmitting data representing said specific user has said right to speak to said terminal of said specific user.

5. The information processing method as set forth in claim 3, further comprising discarding audio data received from a terminal of a user whose identification information is not registered as said identification information of said user having said right to speak in said data storage.

6. A computer-readable medium encoded with a computer program that when executed causes a computer to perform an information processing method for a right to speak in an audio teleconference, said information processing method comprising:

receiving a request to transfer said right to speak, which includes identification information of a first user who is a transfer destination of said right to speak, from a terminal of a second user, without receiving a request to release said right to speak from said terminal of said second user;

judging, by referring to a data storage that stores state data concerning a state of said audio teleconference, said state data including participant data regarding users participating in said audio teleconference and right-to-speak information indicating which of the users has said right to speak, whether a first condition that said identification information of said first user is included in the participant data, and a second condition that identification information of said second user is identical to the right-to-speak information, are satisfied;

upon detecting that said first condition and said second condition are satisfied, storing said identification information of said first user as the right-to-speak information in said data storage storing said state data; and transmitting data representing that said first user has said right to speak to a terminal of said first user.

7. A computer-readable medium encoded with a computer program that when executed causes a computer to perform an information processing method for a right to speak in an audio teleconference, said information processing method comprising:

if a request to acquire said right to speak is received from a terminal of a specific user, judging whether a user having said right to speak already exists by referring to a data storage storing state data concerning a state of said audio teleconference, said state data including, as right-to-speak information, identification information of said user having said right to speak;

if it is judged that said user having said right to speak already exists, confirming whether identification information of said specific user is stored in a priority user storage storing identification information of a user to be given priority; and if it is judged that said specific user identification information is stored in said priority user storage, storing said identification information of said specific user as said right-to-speak information in said data storage without receiving a request to release said right to speak from said user having said right to speak.

8. A computer system for processing a right to speak in an audio teleconference, said computer system comprising:

a data storage that stores state data concerning a state of said audio teleconference, said state data including participant data regarding users participating in said audio teleconference and right-to-speak information indicating which of the users has said right to speak;

a unit that receives a request to transfer said right to speak, which includes identification information of a first user who is a transfer destination of said right to speak from a terminal of a second user;

a unit that judges, by referring to said data storage, whether a first condition that said identification information of said first user is included in the participant data, and a second condition that identification information of said second user is identical to the right-to-speak information, are satisfied;

a unit that stores said identification information of said first user as identification information of a user having said right to speak into said data storage storing said state data upon detecting that said first condition and second condition are satisfied; and a unit that transmits data representing that said first user has said right to speak to a terminal of said first user.

9. A computer system for processing a right to speak, in an audio teleconference, said computer system comprising:

a data storage that stores state data concerning a state of said audio teleconference, said state data including right-to-speak information indicating which user has said right to speak;

a unit that judges, if a request to acquire said right to speak is received from a terminal of a specific user, whether a user having said right to speak already exists by referring to said state data in said data storage;

a unit that confirms whether identification information of said specific user is stored in a priority user storage storing identification information of a user to be given priority, if it is judged that said user having said right to speak already exists; and a unit that stores said identification information of said specific user as said identification information of said user having said right to speak into said data storage without receiving a request to release said right to speak from said user having said right to speak, if it is judged that said identification information of said specific user is stored in said priority user storage.

10. An information processing method for transferring a right to speak from a first user to a second user in an audio teleconference, said information processing method comprising:

automatically judging, by referring to a computer data storage that stores teleconference state data including participant data for users participating in the audio teleconference and speaker identification information indicating which of the users has the right to speak, whether a first condition that a user identifier of the second user is included in the participant data, and a second condition that a user identifier of the first user is identical to the speaker identification information, are satisfied; and upon detecting that the first condition and the second condition are satisfied, storing in the computer data storage the user identifier of the second user as the speaker identification information.

* * * * *

UNITED STATES PATENT AND TRADEMARK OFFICE
CERTIFICATE OF CORRECTION

PATENT NO.        : 7,359,497 B2                                            Page 1 of 1
APPLICATION NO.   : 11/025790
DATED             : April 15, 2008
INVENTOR(S)       : Hisayuki Morishima et al.

It is certified that error appears in the above-identified patent and that said Letters Patent is hereby corrected as shown below:

Col. 14, line 6, delete "indentification" and insert --identification--, therefor.

Signed and Sealed this

Nineteenth Day of August, 2008

JON W. DUDAS
*Director of the United States Patent and Trademark Office*